United States Patent [19]

Dolezal et al.

[11] 4,245,710

[45] Jan. 20, 1981

[54] CENTRIFUGAL WATER-AIR SEPARATION IN EARTH DRILLING BITS

[75] Inventors: George E. Dolezal, Friendswood; Richard T. Upton, Houston, both of Tex.

[73] Assignee: Hughes Tool Company, Houston, Tex.

[21] Appl. No.: 921,700

[22] Filed: Jul. 3, 1978

[51] Int. Cl.³ .............................. E21B 10/18
[52] U.S. Cl. .................. 175/337; 55/457; 175/340; 175/324
[58] Field of Search ............... 175/337, 340, 324, 69, 175/339, 371, 372; 55/457

[56] References Cited

U.S. PATENT DOCUMENTS

| 1,809,375 | 6/1931 | Chase | 55/457 UX |
| 2,329,745 | 9/1943 | Crook | 175/337 |
| 2,961,064 | 11/1960 | Fisher | 55/457 |
| 3,885,935 | 5/1975 | Nutter | 55/457 |
| 4,089,665 | 5/1972 | Brookman | 55/457 |

FOREIGN PATENT DOCUMENTS 220903  7/1968  U.S.S.R. .................. 175/337

Primary Examiner—William F. Pate, III
Attorney, Agent, or Firm—Robert A. Felsman

[57] ABSTRACT

A rock bit used for drilling with air as the circulating fluid, and a centrifugal separator to filter liquid and other contaminants from the air diverted to the bit bearings. The filter generates a fluid vortex with radial vanes, each having plural pitches, located within the shank of the bit. Bearing coolant passages, located beneath the separator, receive filtered air from a central, filtered air location. The vortex centrifugally forces the water and other contaminants outwardly into nozzle passages that direct fluid toward the bottom of the borehole.

7 Claims, 4 Drawing Figures

CENTRIFUGAL WATER-AIR SEPARATION IN EARTH DRILLING BITS

BACKGROUND OF THE INVENTION

1. Field of the Invention

This invention relates to earth drilling with rock bits that utilize air as the circulating fluid, and especially to filtering means used to provide filtered air to the bearings of such bits.

2. Description of the Prior Art

Some earth drilling systems use air to cool the bit and carry earth cuttings from the bottom of the hole to the surface. Water is often injected into the air pumped to the bit. A variety of apparatus and methods have been previously suggested for separating the water from the air pumped to the rock bits to isolate the bearings from detrimental water while permitting filtered air to cool the bearings.

U.S. patent of J. G. Jackson, U.S. Pat. No. 3,094,175, issued June 18, 1973, discloses the use of a centrifugal separator with a spiralled flight or flange in pursuit of the above objects. A similar separator is disclosed in the U.S. patent of W. M. Crook, U.S. Pat. No. 2,329,745, issued Sept. 21, 1943, to separate grit from the liquid often circulated in oil and gas well drilling. Another spiralled centrifugal separator is disclosed in the U.S. patent of Dysart, U.S. Pat. No. 3,788,408, issued Jan. 29, 1974.

The use of individual tubes, sometimes combined with a diffuser, has been previously disclosed as for example in the above patent to Dysart. Radial vane separators have been used in other arts. Air has been cleaned by one such separator for the carburetor intakes of tractors to minimize the induction of dust and other contaminants into engines.

SUMMARY OF THE INVENTION

A liquid-air separator having radial vanes is used above the bearing air coolant passages of a rock bit to generate a vortex that centrifugally throws water and other contaminants outwardly. The air coolant passages leading to the bearing of the bit are located within the resulting centrally located clean air region while water flows into nozzle passages and to the bottom of the borehole. In the preferred embodiment the vanes each have differing inner and outer pitches relative to the direction of flow. This radial vane, vortex generator has been found to be a highly efficient filtering means when used in a rock bit. The above as well as additional objects, features and advantages of the invention will become apparent in the following detailed description.

DESCRIPTION OF THE PREFERRED EMBODIMENT

Figure 1:
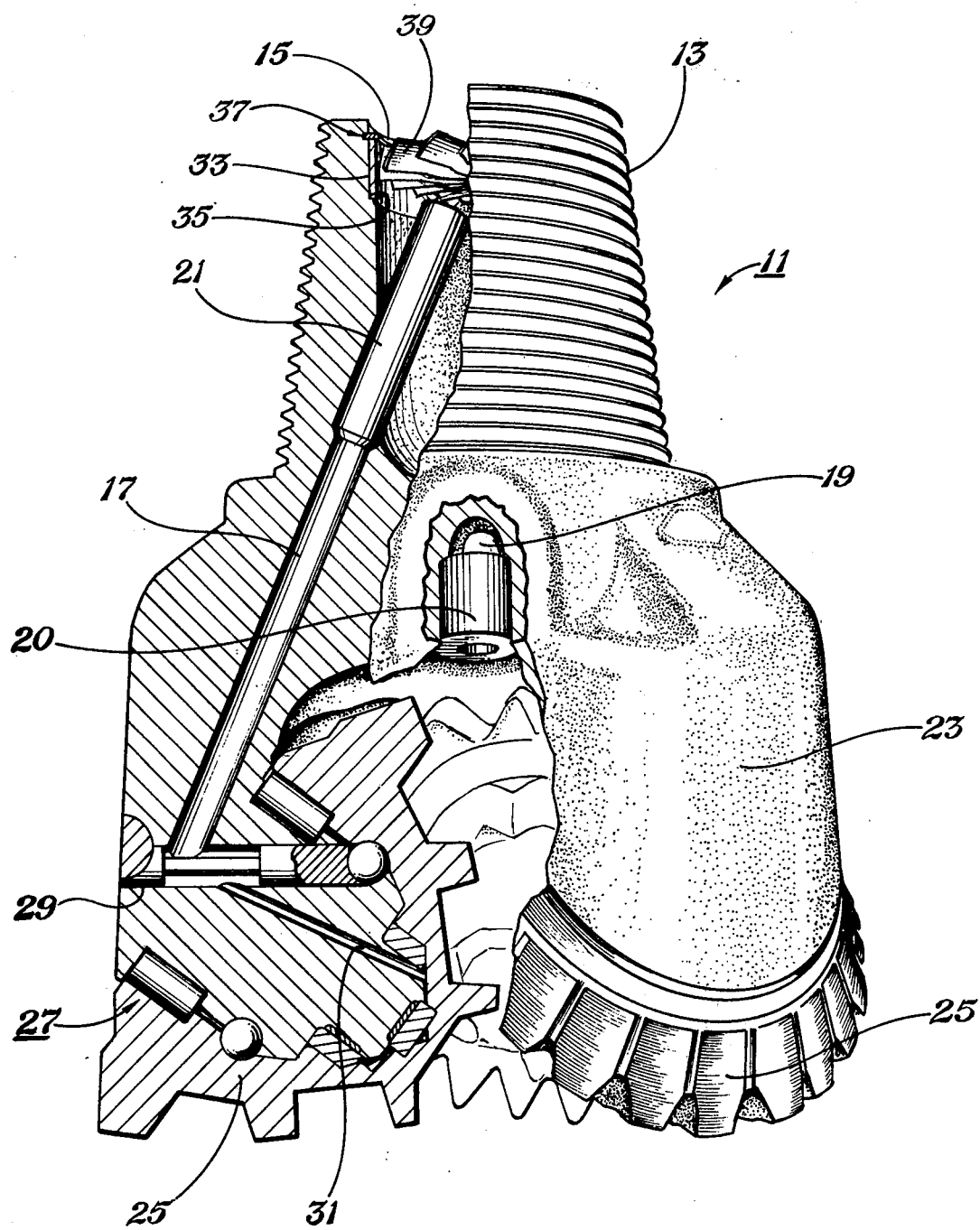
FIG. 1 is a fragmentary perspective view, partially in longitudinal section, of a rock bit having the vortex air filtering system of the present invention.

The numeral 11 in the drawings designates a rock bit having a threaded shank end 13 to which is attached a drill pipe or member (not shown) connected with a drilling machine (not shown) on the surface of the earth to rotate the pipe and bit. The shank end is hollow at 15 and connected with bearing coolant passages 17, nozzle passages 19 and nozzles 20. An open ended tube 21 is partially inserted and sealed in the upper end of each bearing coolant passage 17.

The bit body also has a lower, drill cutter end 23 to which is rotatably secured at least one but usually three rock cutters 25 of one of the many prior art types. Bearing means 27, here a combination of friction and antifriction bearings, are used between the bit body and cutters. A welded plug 29 with air passages and additional bearing coolant passages 31 permit cooling air flow to the bearing means.

Figure 2:
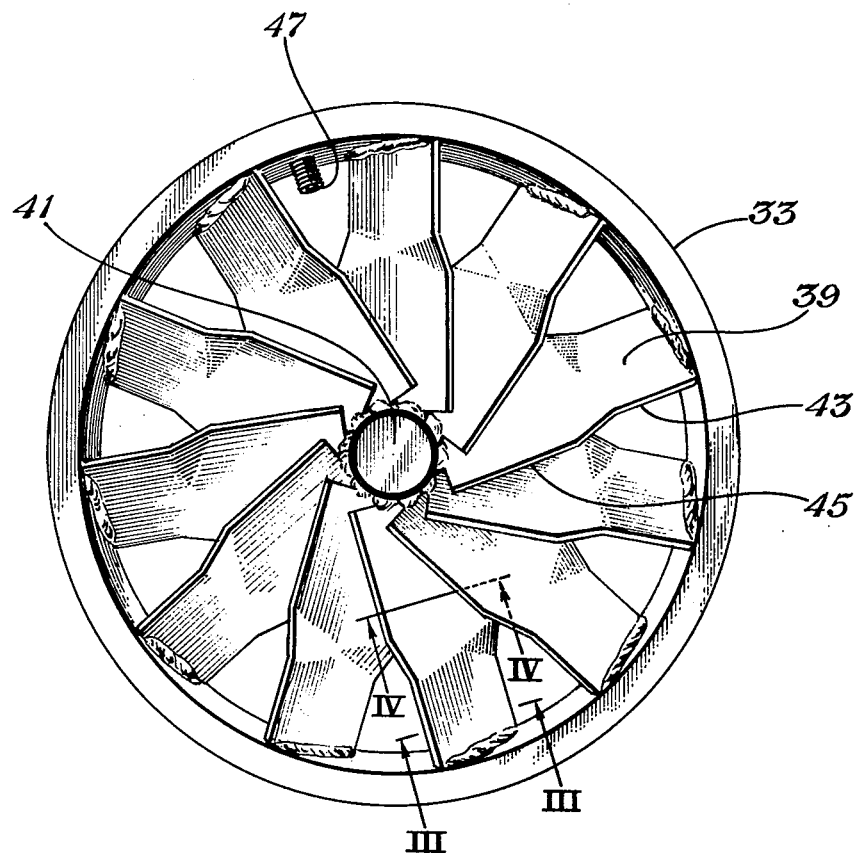
FIG. 2 is a top view of the filter shown in FIG. 1.
Figure 3:
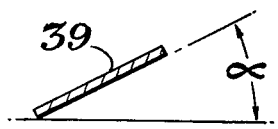
FIGS. 3 and 4 are cross-sectional views as seen looking respectively along the lines III—III and IV—IV of FIG. 2.
Figure 4:

There is located in the hollow end 15 of the shank 13 a support ring 33 positioned in a mating recess 35 and secured by a removable resilient (snap) ring 37. A plurality or radial and fixed vanes 39 extend at pitch angles alpha ($\alpha$) and beta ($\beta$) (see FIGS. 2, 3 and 4) between the interior of support ring 33 and the center support 41. Each vane 39 has an outer portion 43 and an inner portion 45 with differing pitches $\alpha$ and $\beta$, the larger pitch being near the support ring 33. A set screw 47 is used to engage a mating hole (not shown) inside the hollow inside of the shank 15 to prevent rotation of the vanes.

A separator of the above configuration was inserted in a $12\frac{1}{4}$ inch diameter "Hughes" HH99 type blast hole rock bit. A first recess was bored to a diameter of about $3\frac{1}{2}$ inches and to a length of about $4\frac{5}{8}$ inches below the top of the shank 13. This minimizes distortion of flow due to the presence of surface irregularities that otherwise might be inside the shank. The support ring 33 and separator were inserted into the recess 35 and retained against linear movement by snap ring 37. Radial movement was prevented by screwing the set screw 47 into a mating hole (not shown) in the bit shank.

In operation air and injected water are pumped from the surface machinery through the pipe and into the bit 11. The fixed vanes generate a vortex that centrifugally forces water particles and other contaminants outward into the hollow portion of the shank and into the nozzle passage 19. Clean air is received in the opened ends of the tubes 21 and is fed to the bearing coolant passages 17.

The separator achieved substantially one hundred percent separation of visible water from the air in a laboratory test during which 1300 cubic feet per minute (cfm) and two gallons per minute (gpm) of water was pumped over a five minute time interval through the bit and separator. The support ring 33 had an outside diameter of four inches, a radial thickness of 3/16 inch, and a depth of one inch. The eleven vanes were about $\frac{3}{4}$ inch in width, 1/16 inch thick with pitch angles $\alpha$ and $\beta$ of 40 and 30 degrees respectively.

The tubes 21 had open ends located a distance of $1\frac{3}{4}$ inches below the separator, an outside diameter of 13/16 inch and an inside diameter of about $\frac{3}{4}$ inch.

While the invention has been described in only one of its forms, it should be apparent to those skilled in the art that it is not so limited, but is subject to various changes and modifications without departing from the spirit or scope thereof. The separator may be used in a sub located above the bit rather than inside the shank of the bit.

We claim:

1. A rock bit for air drilling, with an improved filtering system to provide filtered air to the bit bearings, said bit comprising:

a bit body having a drill cutter end and a hollow shank end for connection to a rotatable drill pipe;

a rock cutter secured rotatably to the drill cutter end;

bearing means between the cutter and bit body;

a bearing coolant passage communicating with the hollow shank end of the bit body and the bearing means;

a nozzle passage between the hollow shank end and the cutter end of the bit body;

a support ring adapted to fit within the hollow shank end of the bit body above the nozzle passage;

a plurality of radially oriented vane means extending into engagement without use of a diffuser inwardly from the support ring, each pair of vane means separated by a space to permit maximum air flow through each space, and each vane means having a generally uniform thickness and a pitch angle to minimize pressure drop in the air flowing across the separator;

a tube extending from the bearing coolant passages to a central location beneath the vanes.

2. A rock bit for air drilling, with an improved filter system to provide filtered air to the bit bearings, said bit comprising:

a bit body having a drill cutter end and a hollow shank end for connection to a rotatable drill pipe;

a rock cutter secured rotatably to the drill cutter end;

bearing means between the cutter and bit body;

a bearing coolant passage communicating with the hollow shank end of the bit body and the bearing means;

a nozzle passage between the hollow shank end and the cutter end of the bit body;

a support ring adapted to fit within the hollow shank end of the bit body above the nozzle passage;

a plurality of transverse vane means extending inwardly from the support ring, each pair of vane means separated by a space to permit airflow therebetween, and each vane means have planar surfaces and a pitch angle to minimize pressure drop in the air flowing across the separator and to generate a vortex sufficient to throw liquid particles outwardly;

a center support means to secure the inner ends of the radial vanes;

tube means extending from the bearing coolant passage, with an opening located generally centrally beneath said vanes.

3. A rock bit for air drilling, with an improved filter system to provide filtered air to the bit bearings, said bit comprising:

a bit body having a drill cutter end and a hollow shank end for connection to a rotatable drill pipe;

a rock cutter secured rotatably to the drill cutter end;

bearing means between the cutter and bit body;

a bearing coolant passage communicating with the hollow shank end of the bit body and the bearing means;

a nozzle passage between the hollow shank end and the cutter end of the bit body;

support means adapted to fit within the hollow shank end of the bit body above the nozzle passage;

a plurality of transverse vanes extending inwardly from the support ring, each pair of vanes separated by a space to permit airflow therebetween, and each vane means having a pitch angle between 30 and 40 degrees;

a center support means to secure the inner ends of the radial vane means;

tube means extending from the bearing coolant passage with an opening located generally centrally beneath said vane means.

4. For use with the rock bit for air drilling, having a bit body with a drill cutter end and a hollow shank end for connection to a rotatably drill pipe, a rock cutter sesecured rotatably to the drill cutter end, bearing means between the cutter and bit body, a bearing coolant passage communicating with the hollow shank end of the bit body and the bearing means, a nozzle passage between the hollow shank end and the cutter end of the bit body, the improvement comprising:

a support ring adapted to fit within the hollow shank end of the bit body above the nozzle passage;

a plurality of radially oriented vane means extending into engagement without use of a diffuser inwardly from the support ring, each pair of vane means separated by a space to permit air flow through each space, and each vane means having a generally uniform thickness and a pitch angle to minimize pressure drop in the air flowing across the separator;

a connector means to secure the inner ends of the radial vanes;

the outermost end of each vane means having a selected pitch and the inner end of each vane means having a greater pitch;

tube means extending from the bearing coolant passage, with an opening located generally centrally beneath said vane means.

5. For use with rock bit for air drilling, having a bit body with a drill cutter end and a hollow shank end for connection to a rotatable drill pipe, a rock cutter secured rotatably to the drill cutter end, bearing means between the cutter and bit body, a bearing coolant passage communicating with the hollow shank end of the bit body and the bearing means, a nozzle passage between the hollow shank end and the cutter end of the bit body, the improvement comprising:

a receptacle within the hollow shank end of the bit body above the nozzle passage;

a plurality of transverse vane means extending inwardly from the support ring, each pair of vane means separated by a space to permit airflow therebetween, and each vane means have planar surfaces and a pitch angle to minimize pressure drop in the air flowing across the separator and to generage a vortex sufficient to throw liquid particles outwardly; connector means to secure the generally radial vane means, without use of a diffuser means, at least one tube extending from the bearing coolant passage, with an opening generally centrally beneath said vane means.

6. The apparatus of claim 5 wherein the inner ends of said vanes reside at one angle and the outer ends reside at another angle.

7. The apparatus of claim 6 and the angle of the inner ends is about 30 degrees relative to a plane perpendicular to the separator central axis and the outer end is at an angle of about 40 degrees.

* * * * *

UNITED STATES PATENT OFFICE
CERTIFICATE OF CORRECTION

Patent No. 4,245,710          Dated  January 21, 1981

Inventor(s)   GEORGE E. DOLEZAL and RICHARD T. UPTON

It is certified that error appears in the above-identified patent and that said Letters Patent are hereby corrected as shown below:

Claim 4, L3, delete "rotatably" and insert therefor -- rotatable --.

Claim 4, L11, delete "sesecured" and insert therefor -- secured --.

Claim 4, L31, delete "greater" and insert therefor -- lesser --.

Claim 5, L51, delete "generage" and insert therefor -- generate --.

Signed and Sealed this

Sixteenth Day of June 1981

[SEAL]

*Attest:*

RENE D. TEGTMEYER

*Attesting Officer*     *Acting Commissioner of Patents and Trademarks*